Nov. 12, 1946.   F. BAUMGARTNER   2,410,800
GAME DEVICE
Filed April 24, 1944

INVENTOR.
Fred Baumgartner
BY
ATTORNEY.

Patented Nov. 12, 1946

2,410,800

UNITED STATES PATENT OFFICE 2,410,800

GAME DEVICE

Fred Baumgartner, Kansas City, Mo.

Application April 24, 1944, Serial No. 532,433

3 Claims. (Cl. 35—9)

My invention relates broadly to games and more particularly to a new type of question and answer game board.

An important object of my invention is to provide a game that will afford an interesting and amusing pastime for all who participate.

Another object of my invention is to provide a game that is educational as well as amusing.

Still another object of my invention is to provide a game that can be played with substantial enjoyment by either young or old persons.

A further object of my invention is to provide a game that is simple and inexpensive to print and assemble.

Other objects and advantages of my invention will be apparent during the course of the following description.

Figure 1:
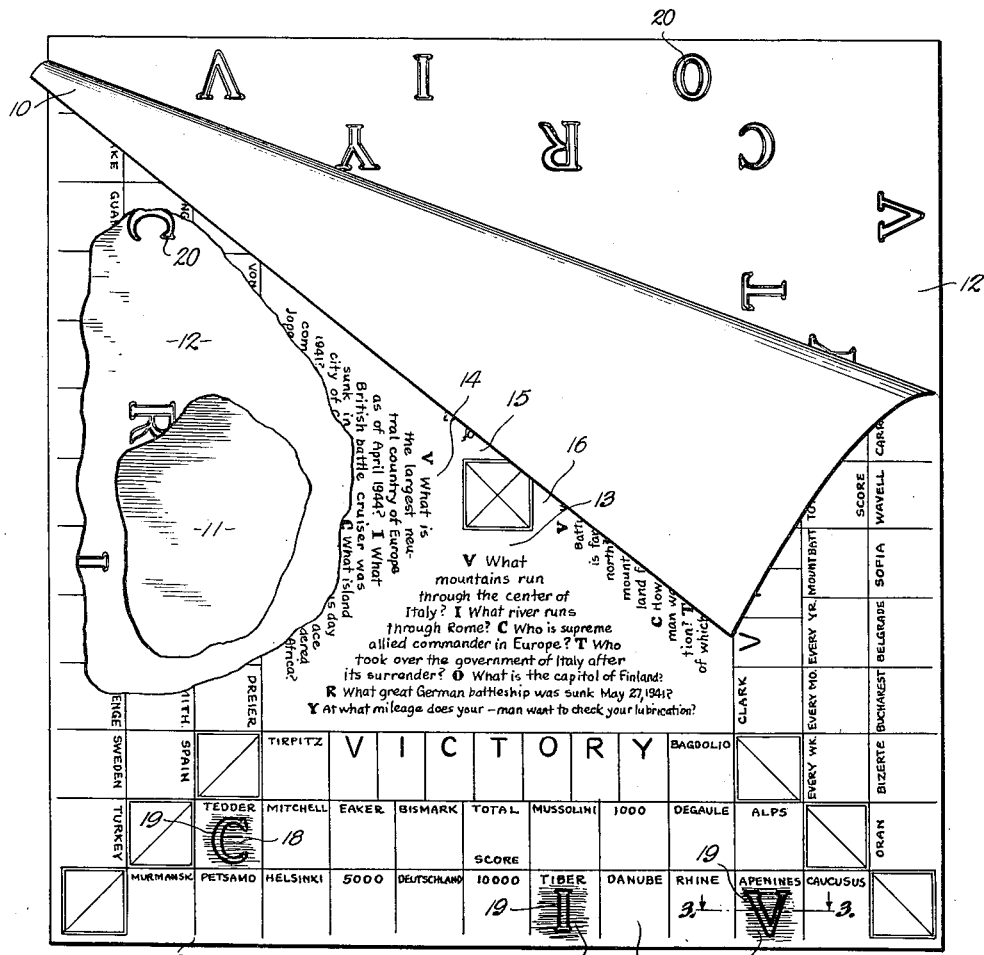
Figure 2:
Figure 3:
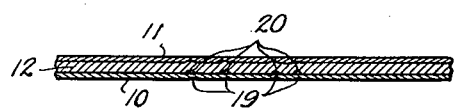

In the drawing forming a part of this specification and wherein like numerals are employed to designate like parts throughout the same, Fig. 1 is a top plan view of a game device embodying my invention, Fig. 2 is an edge elevation of the game device, and Fig. 3 is a fragmentary transverse sectional view taken on the line 3—3 of Fig. 1.

In the drawing, wherein for the purpose of illustration is shown a preferred embodiment of my invention, the numerals 10 and 11 designate sheets of paper superposed on the upper and lower faces respectively of an intermediate sheet 12. The latter sheet is preferably of light cardboard stock. Top sheet 10 is divided into four essentially triangular shaped areas 13, 14, 15 and 16. Printed on the inner portion of each quadrant or area is a plurality of questions designated by the letters "V-I-C-T-O-R-Y." The outer portion of each area is divided into a plurality of squares 17. On each of these squares is printed an answer to one of the questions printed thereabove. In the embodiment of the invention shown in Fig. 1, there are three answer squares 17 for each question but only one of these answers is correct. A person playing the game must read the question and then select the square 17 containing the correct answer. The player can ascertain whether he has picked the correct answer by rubbing the selected square with a pencil lead or other coloring material, as shown at 18. If the correct answer has been selected a letter corresponding to the letter designating the question will appear in the square, as at 19. If the correct answer was not selected no letter will appear.

The above result is achieved by impressing letters 20 in the intermediate sheet 12 corresponding in appearance and number to the letters designating the questions and located to underlie the squares containing the correct answers. For example, the letter "V" is impressed in the intermediate sheet 12 underlying the square containing the correct answer to the first question; the letter "I" is impressed in sheet 12 directly under the square containing the correct answer to the second question, etc. It is desirable that the letter underlying the correct answer correspond to the letter designating the question so that the player is able to determine whether he has correctly answered the particular question. I have found that it is immaterial whether the letters 20 are impressed downwardly or upwardly. Either manner of impressing the letters in the sheet will cause it to appear on sheet 10 when the latter sheet is rubbed with a pencil or other suitable coloring material. The letters should be impressed into the sheet in relatively low or slight relief in order that their identity may be difficult to determine except by rubbing with a crayon, lead pencil or other marking device.

It is also contemplated that coloring material be present in the top sheet 10 in such form that it is brought to the surface and rendered visible when the sheet is rubbed with a finger or a blunt instrument. The color, of course, is brought out primarily above the characters 20 and thus reproduces them on the top sheet. This method of bringing out the characters eliminates the need for a pencil or coloring material when playing the game.

The bottom sheet 11 is provided to cover the back of the intermediate sheet 12 and conceal the letters 20 which otherwise would be visible. This sheet can be omitted, however, without affecting the playing of the game. Its sole purpose is to prevent a player from locating the correct square by inspecting the back of the board and noting the location of the letters.

It is to be understood that characters other than the letters "V-I-C-T-O-R-Y" may be used to designate the questions and answers. For example, the questions may be designated by numerals or any selected signs or indicia. It is desirable only that the characters 20 in sheet 12 correspond in appearance with the indicia designating the questions.

As suggested, I have here shown a game board wherein three answers are provided for each question. However, the game can be simplified by providing only two answers for each question or it can be made more difficult by providing four or more answers for each question. The number of answers per question is arbitrary and may be varied accordingly.

While I have here shown a separate set of questions and answers in each of the four sections 13, 14, 15 and 16, it is to be understood that the top sheet 10 may be provided with but one set of questions and answers or any desired number of sets.

The form of the invention here shown and described is to be taken as a preferred example of the same. Various changes in the size, shape and arrangement of parts may be resorted to without departing from the spirit of my invention or the scope of the appended claims.

Having thus described my invention, I claim:

1. A game device comprising a pair of superposed sheets, the top sheet of opaque material having an unexposed layer of coloring material beneath its top surface, selected characters impressed in the upper surface of the bottom sheet, markings on the exposed surface of the top sheet dividing portions thereof into framed areas whereby rubbing of the exposed surface of the top sheet with a blunt instrument or marking device at the undefined location of the selected characters reproduces said characters within the framed areas of the top sheet.

2. A game device comprising a pair of superposed sheets, the top sheet of opaque material having an unexposed layer of coloring material beneath its top surface, selected characters impressed in the upper surface of the bottom sheet, markings on the exposed surface of the top sheet dividing portions thereof into framed areas whereby rubbing of the exposed surface of the top sheet with a blunt instrument or marking device at the undefined location of the selected characters reproduces said characters within the framed areas of the top sheet.

3. A game device comprising a pair of superposed sheets, the top sheet of opaque material having an unexposed layer of coloring material beneath its top surface, selected characters impressed in the upper surface of the bottom sheet, indicia on the upper sheet designated by said selected characters, markings on the exposed surface of the top sheet dividing portions thereof into framed areas whereby rubbing of the exposed surface of the top sheet with a blunt instrument or marking device at the undefined location of the selected characters reproduces a character indicating the selected indicia.

FRED BAUMGARTNER.